United States Patent [19]
Grieb et al.

[11] Patent Number: 4,947,642
[45] Date of Patent: Aug. 14, 1990

[54] PROPFAN TURBO-ENGINE

[75] Inventors: Hubert Grieb, Germering; Helmut-Arnd Geidel, Karlsfeld, both of Fed. Rep. of Germany

[73] Assignee: MTU Motoren- und Turbinen-Union Munchen GmbH, Fed. Rep. of Germany

[21] Appl. No.: 334,533

[22] Filed: Apr. 7, 1989

[30] Foreign Application Priority Data

Apr. 11, 1988 [DE] Fed. Rep. of Germany ....... 3812027

[51] Int. Cl.$^5$ ........................ F02K 3/072; F02C 3/067
[52] U.S. Cl. .................................... 60/226.1; 60/268; 60/39.162; 416/129; 416/170 R; 74/DIG. 5
[58] Field of Search .................. 60/226.1, 39.162, 268; 416/128, 129, 171, 170 R; 415/65, 66, 68, 69; 74/DIG. 5

[56] References Cited

U.S. PATENT DOCUMENTS

| | | | |
|---|---|---|---|
| 3,673,802 | 7/1972 | Krebs et al. | 60/268 |
| 4,751,816 | 6/1988 | Perry | 60/39.162 |
| 4,790,133 | 12/1988 | Stuart | 60/39.162 |

FOREIGN PATENT DOCUMENTS

| | | |
|---|---|---|
| 3611792 | 11/1986 | Fed. Rep. of Germany . |
| 3614157 | 11/1986 | Fed. Rep. of Germany . |
| 2152466 | 4/1973 | France . |
| 2129502 | 5/1984 | United Kingdom .................. 60/268 |
| 2194292 | 3/1988 | United Kingdom . |
| 2194593 | 3/1988 | United Kingdom ............. 60/39.162 |
| 2195712 | 4/1988 | United Kingdom . |
| 2198791 | 6/1988 | United Kingdom ............ 416/170 R |
| 2199375 | 7/1988 | United Kingdom ............. 60/39.162 |

OTHER PUBLICATIONS

Article from 452 Journal of Aircraft, 22 (1985), Apr., No. 4, N.Y., U.S.A. titled: "Studies of Convertible Turboshaft/Turbofan Engines for High-Speed Rotocraft-"-pp. 296–302, R. E. Neitzel, R. Hirschkron & P. W. Vinson.

Primary Examiner—Donald E. Stout
Attorney, Agent, or Firm—Evenson, Wands, Edwards, Lenahan & McKeown

[57] ABSTRACT

A propfan turbo-engine has two shrouded propfan rotors arranged upstream of a gas turbine which are driven by a contra-rotating working turbine. In addition to a favorable flow onto the blades, a low weight of the engine can be achieved.

9 Claims, 2 Drawing Sheets

PROPFAN TURBO-ENGINE

BACKGROUND AND SUMMARY OF THE INVENTION

The present invention generally relates to a propfan turbo-engine, and more particularly to a propfan turbo-engine arrangement which has favorable aerodynamic characteristics while providing a high mass throughout.

From German Published Unexamined Patent Application No. (DE-OS) 36 14 157, a propfan turbo-engine of the type concerned here is disclosed, in which contra-rotating turbine rotors are, at the same time, constructed as propfan rotors so that two rows of propfan blades are mounted radially outside of and behind the driving turbine. This constructively complicated design, which does not require a gear, has the disadvantage, however, that the geometrical parameters of the propfan blades and of the working turbine cannot be set independently of one another and can thus not be optimized, so that a compromise must always be found.

In particular, the relatively large hub ratio of the propfan blades, thus the ratio of the inside diameter of the blade to the outside diameter of the blade, is disadvantageously large, since, for aerodynamic reasons, the working turbine must have a certain minimum diameter. In addition, for the same reason, the peak circumferential speed of the propfan blades must be relatively high in order to limit the number of turbine stages and/or the aerodynamic stress. In practice, this results in a higher noise level for the cabin (close noise) as well as for the environment (remote noise), when the given, i.e., limited means for a noise reduction at the engine itself are taken into account.

It is also a disadvantage in the above-noted propfan turbo-engine, that the approach flow conditions of the propfan blades, as a result of the gas turbine body, which is arranged upstream of the propfan blades, during normal flight, are disturbed at least in proximity of the hub of the propfan. Additionally, for example, during take-off, because of the high angle of incidence of air flow relative to the flight direction, and in this case, particularly in the transition phase during take-off (up to 25°), air disturbance and separation due to the gas turbine body are extremely unfavorable. In addition, the adjusting devices for the propfan blades must extend through a hot turbine duct, as a result of which unfavorable blade cross-sections and corresponding losses must be expected.

The contra-rotating propfan described above can be surrounded by a shroud, in order to increase the disk loading (circular thrust/propeller area), i.e., in order to increase the pressure ratio, for example, as well as for mounting reasons, or in order to reduce the propeller diameter, and particularly in order to reduce the generating of noise. However, with the turbine in the propeller hub, as a result of the drawing-in of external air, a jet is formed, which is particularly strong with a high thrust loading and has an extremely disadvantageous jet contour. The resulting shroud contour obtained for this configuration has an unfavorable surrounding flow and a correspondingly high resistance, combined with a sensitivity with respect to a flow breakaway under critical flying conditions (for example, in the case of a diagonal approach flow).

From German Publish Unexamined Patent Application No. (DE-OS) 36 11 792, a propfan turbo-engine is disclosed, which is of a similar type and in which the propfan rotors are arranged upstream of the gas turbine; and thus a number of the above-mentioned problems can be eliminated. However, it is a disadvantage of this construction that for driving the contra-rotating propfan rotors, a very high-capacity step-down gear is required, which, in addition to the connected high weight, requires an expensive gear cooling system. The installation of a step-down gear of this type also results in increased servicing expenditures as well as in an increased susceptibility to disturbances of the whole turbo-engine.

In addition, in the above-noted arrangement, the guiding of the blade adjustment of one rotor by the gear represents a considerable constructive complication.

Thus, it is an object of the invention to provide a propfan turbo-engine having contra-rotating propfan rotors, in which, while a high mass throughput is obtained, a favorable approach flow can be achieved with a low flow resistance and a low engine weight.

This object is achieved according to the invention by providing a propfan turbo-engine having two contra-rotating propfan rotors and a gas turbine, which includes a gas generator and a working turbine, the working turbine having two contra-rotating turbine rotors equipped with blades and mounted at two concentric shafts these shafts extending radially inside the gas generator through the gas turbine, and being connected with one propfan rotor respectively, these propfan rotors being arranged upstream of the gas turbine and being surrounded by a shroud.

This arrangement of the present invention has an advantage that, because of the mounting of the propfan rotors upstream of the gas turbine, a minimal hub diameter and thus an optimal hub ratio of the propfan blades in the entry plane can be achieved. In combination with the covering of the gas turbine, this results in an aerodynamically very favorable contour of the propfan shroud.

This low hub ratio at the propfan entry, in comparison to contra-rotating propfans without any shroud, with a contra-rotating turbine arranged in the hub, results in a desirable low blocking of the cross-section of the circular area in all flying conditions.

In the case of the contra-rotating propfan without any shroud, the approach flow Mach number is approximately equal to the flying speed, so that this Mach number is limited to the range below Mach 0.82–0.85. In the present case, i.e., in the case of the contra-rotating propfan with a shroud, the approach flow Mach number is set by the contour of the shroud and the design of the propfan rotors, i.e., it is independent of the flying speed. Thus, in the case of an arbitrarily high flying speed, the approach flow Mach number of the propfan may be set to be optimal with respect to the flow, i.e., in the range of 0.76–0.78. While, in the case of the contra-rotating propfan without any shroud, at a high flying speed, the flow can escape radially toward the outside, although with the occurrence of local losses, this problem is eliminated from the start in the case of the contra-rotating propfan with a shroud by the above-mentioned setting or limiting of the flow-through Mach number.

In accordance with advantageous features of certain preferred embodiments of the present invention, the geometrical parameters of the working turbines and the propfan rotor may be designed to be largely independent of one another. In addition, adjusting devices for pivotable propfan blades may be housed without any problem in the hub area of the propfan rotors. Advantageously, in comparison with previously known designs with forward propfan rotors, the considerable weight of a gear is eliminated, including the oil cooler, together with the disadvantages connected with it.

In an advantageous further feature of preferred embodiments of the present invention, the propfan stages together have a pressure ratio range of between about 1.25 and 1.35. This has the advantage that, as in the case of the propfan without any shroud, by adjustable rotor blades, a thrust reversal can be achieved in a simple manner, and the installation of an expensive and heavy mechanical thrust reversal device in the bypass duct of the turbo-engine is not necessary. This also results in a particularly short, fluidically advantageous fan shroud as well as increased protection from technical disturbances.

In an alternative embodiment of the present invention, the propfan blades, with the pressure ratio of both rotors being above about 1.4, are constructed without any adjustment, in which case, however, a conventional thrust reversal device must be arranged in the bypass flow duct located behind it or in the correspondingly extended propfan shroud.

It is also advantageous that, as a result of the favorable assignment of the propfan and the turbine diameter, which is possible in this case, the turbine rotors, according to the propfan pressure ratio or the propfan throughput/engine throughput ratio, in the technically important area, have between three and five blade rings respectively. As a result, a high specific activity is converted in the working turbine, with a low overall length and a low weight, so that a large bypass ratio of the engine can be achieved.

In a further feature of preferred embodiments of the present invention, an intermediate-pressure compressor disposed on a separate intermediate-pressure compressor shaft, by a gear, is coupled with the exterior shaft driving the rear propfan rotor. At the same time, the outer turbine rotor, which is coupled with it, has one more turbine nozzle than the inner turbine rotor which is coupled with the front propfan rotor. This permits a thermodynamically favorable setting of the overall compression with a limited pressure ratio of the high-pressure compressor which follows the intermediate-pressure compressor, and, on the other hand, a drive of the intermediate-pressure compressor without any extensive expenditures in comparison to known 3-shaft engines, with a 2-shaft core engine.

The gear is preferably constructed as a planetary gear, the outer propfan shaft being connected with a ring gear, and its planet wheels being arranged stationarily. As a result, a space-saving translation is made possible of the relatively low shaft speeds to the high speeds which are required for an effective compressor operation.

In a further alternative embodiment of the present invention, the outer propfan shaft is connected with the planet wheels, and the intermediate-pressure compressor shaft is connected with a sun wheel, a ring wheel being arranged stationarily. The latter arrangement is particularly suitable if a significantly higher rotational speed is required for the intermediate-pressure compressor than for the outer propfan shaft.

Other objects, advantages and novel features of the present invention will become apparent from the following detailed description of the invention when considered in conjunction with the accompanying drawings.

DETAILED DESCRIPTION OF THE DRAWINGS

Figure 1:
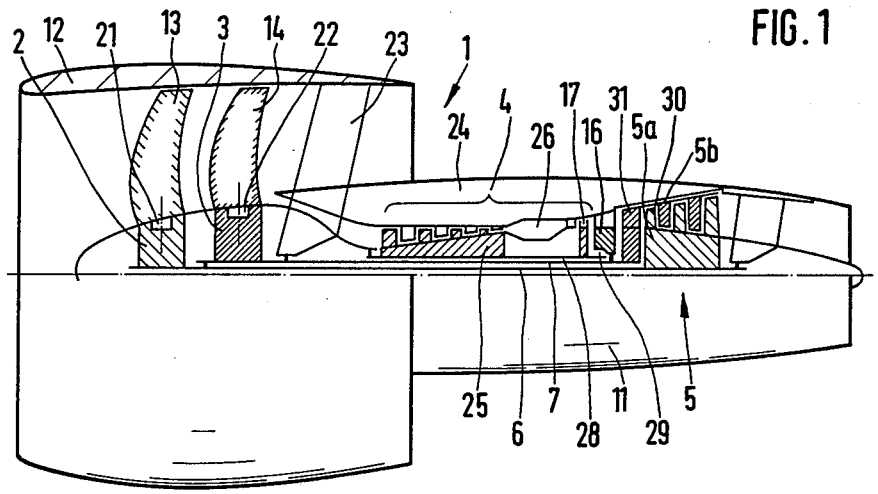
FIG. 1 is a partial sectional schematic view of a propfan turbo-engine constructed in accordance with a preferred embodiment of the present invention.

The propfan turbo-engine 1 shown in FIG. 1 includes a gas turbine 11 and two propfan rotors 2, 3 arranged upstream, at which propfan blades 13, 14 are mounted and distributed over the circumference. The propfan blades 13, 14 are pivoted by adjusting devices 21, 22, which are not shown in detail in the Figures. Radially outside the propfan blades 13, 14, a shroud 12 is provided, which extends in the axial direction of the engine on both sides of the propfan blades 13, 14. The shroud 12 is mounted at the exterior housing 24 of the gas turbine 11 by a number of regularly spaced ribs 23.

The gas turbine 11 includes a gas generator 4, behind which, with respect to the flow, a working turbine is connected. The gas generator 4 has a high-pressure compressor 25, a combustion chamber 26 and a gas generator turbine 17 which are connected with one another by a high-pressure turbine shaft 28. Together with shaft 7, the high-pressure turbine shaft 28 is disposed in the turbine section, by a bearing 29, in a bearing support 16, which is constructed as a guide blade ring and is supported in the exterior housing 24.

Downstream of the guide blade ring 16, the working turbine 5 is arranged which consists of two concentric turbine rotors 5a, 5b. The interior turbine rotor 5a, at its outer circumference, is equipped with three rows 30 of turbine blades, while the drum-shaped exterior turbine rotor 5b, at its inner circumference, is also equipped with three rows 31 of turbine blades. In this case, the turbine blade rows 30 and 31 are alternately arranged axially behind one another. The two turbine rotors 5a, 5b are connected with one shaft 6, 7 respectively, these shafts 6, 7 extending concentrically with respect to one another and concentrically inside the high-pressure turbine shaft 28 through the gas generator 4 toward the front. The propfan rotors 2, 3 arranged in the front part of the turbo-engine 1 are each connected with one of the shafts 6, 7 respectively.

Figure 2:
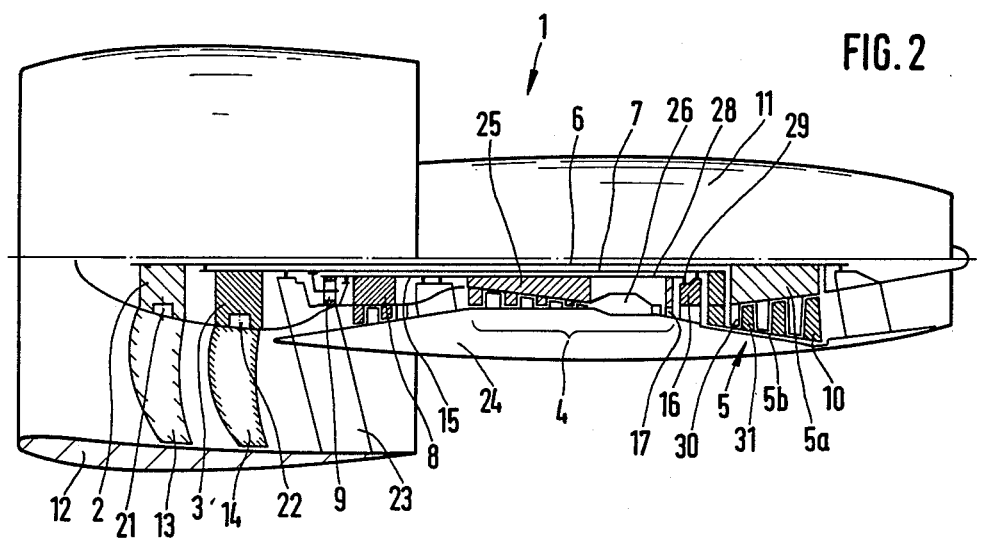
FIG. 2 is a partial sectional view of an alternative embodiment of a propfan turbo-engine.

The concentrically exterior shaft 7, in the embodiment shown in FIG. 2, is connected with a high-pressure turbine shaft 15 by a gear 9, this high-pressure turbine shaft 15 being arranged essentially coaxially in front of the high-pressure turbine shaft 28. In order to make available the higher power required for driving the intermediate-pressure compressor 8 fastened on the intermediate-pressure compressor shaft 15, the turbine rotor 5b coupled with the shaft 7 is equipped with one more turbine blade row or turbine nozzle than the interior turbine rotor 5a.

Figure 3:
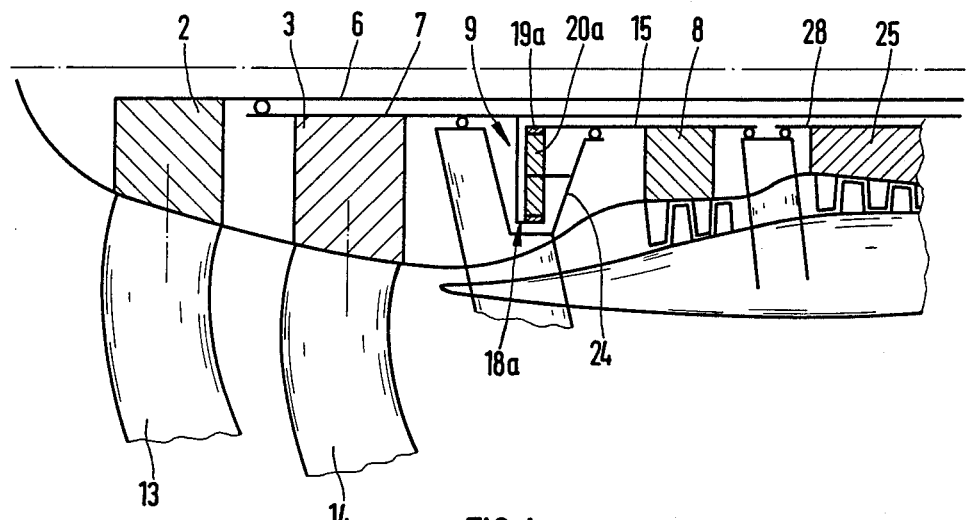
FIG. 3 is a partial schematic view of a portion of the preferred embodiment of FIG. 2 depicting detailes of an intermediate-pressure compressor gear with the intermediate-pressure compressor.

FIG. 3 schematically shows an embodiment of the gear 9 discussed with respect to FIG. 2, in which a ring gear 18a is mounted on the shaft 7. A number of planet wheels 20a are provided, which rotatably and stationarily are mounted at the exterior housing 24, and on the other side, mesh with a toothed ring 19a, the toothed ring 19a being mounted on the intermediate-pressure compressor shaft 15. As a result, the rotation of the shaft 7, in a geared up manner, is transmitted to the intermediate-pressure compressor 8.

Figure 4:
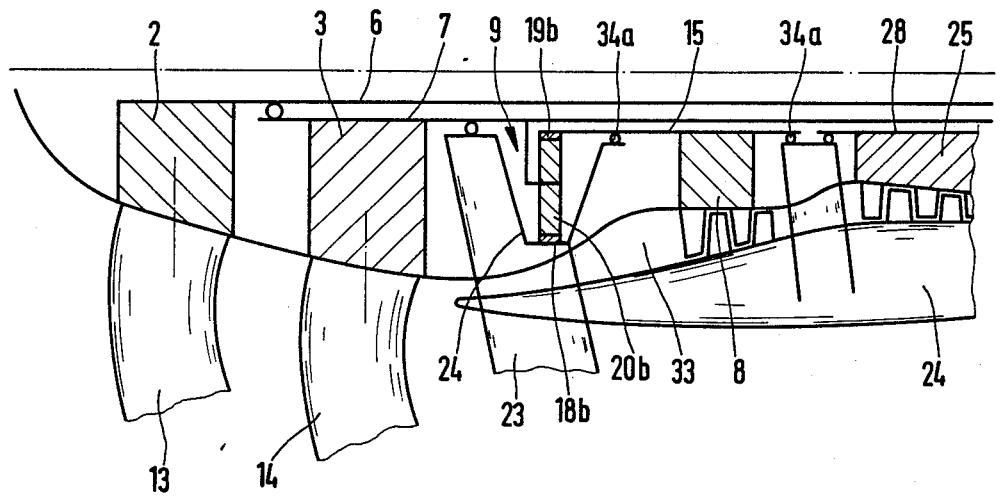
FIG. 4 is a schematic view similar to FIG. 3, showing of an alternative gear construction.

FIG. 4 shows an alternative embodiment of the gear 9, in which the planet wheels 20b are fastened at the shaft 7 and rotate along with it. The planet wheels 20b, on one side, mesh with a toothed ring 18b, which is stationarily supported in the exterior housing 24, and, on the other side, with a sun wheel 19b. The sun wheel 19b is mounted on the intermediate-pressure compressor shaft 15, and drives the intermediate-pressure compressor 8, whereby the air taken into the inlet duct 33 is precompressed in front of the high pressure compressor. The intermediate-pressure compressor shaft 15, by the bearings 34a, 34b, is disposed in the exterior housing 24. Coaxially behind the intermediate-pressure compressor shaft 15, the high-pressure turbine shaft 28 is arranged, on which the high-pressure turbine 27 shown in FIGS. 1 and 2 is fastened next to the high-pressure compressor 25.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A propfan turbo-engine having two contra-rotating propfan rotors and a gas turbine, which includes a gas generator and a working turbine, the working turbine having inner and outer contra-rotating turbine rotors equipped with blades and each mounted at one of two concentric shafts, these concentric shafts extending radially inside the gas generator through the gas turbine, and each concentric shaft being connected with one propfan rotor respectively, these propfan rotors being arranged upstream of the gas turbine and being surrounded by a shroud wherein an intermediate-pressure compressor, disposed on an immediate-pressure compressor shaft, is coupled by gear means, with an exterior shaft, of the two concentric shafts, which drives a rear propfan rotor of the propfan rotors, and wherein the outer turbine rotor, which is coupled with the exterior shaft, has one turbine nozzle more than the inner turbine rotor.

2. A propfan turbo-engine according to claim 1, wherein, at the propfan rotors, propfan blades are adjustably constructed and together have a pressure ratio range of between about 1.25 and 1.35.

3. A propfan turbo-engine according to claim 1, wherein at the propfan rotors, propfan blades with non-adjustable blades are provided which together have a pressure ratio of above 1.40.

4. A propfan turbo-engine according to claim 1, wherein the turbine rotors have three to five blade rings respectively.

5. A propfan turbo-engine according to claim 2, wherein the turbine rotors have three to five blade rings respectively.

6. A propfan turbo-engine according to claim 1, wherein the gear means is constructed as a planetary gear, the shaft being connected with a ring gear, and the intermediate-pressure compressor shaft being connected with a sun wheel, and planet wheels of the planetary gear being arranged stationarily.

7. A propfan turbo-engine according to claim 1, wherein the gear means is constructed as a planetary gear, the shaft being connected with planet wheels, and the intermediate-pressure compressor shaft being connected with a sun wheel, and a ring gear being arranged stationarily.

8. A propfan turbo-engine according to claim 1, wherein the concentric shafts on the side of the gas turbine, are disposed in a bearing support constructed as a guide blade ring and support at an exterior housing, between a gas generator turbine and the working turbine.

9. A propfan turbo-engine according to claim 1, wherein the intermediate-pressure compressor is constructed in two stages to three stages corresponding to a pressure ratio between 1.5 to 2.5.

* * * * *